United States Patent
Aleksandrov et al.

(10) Patent No.: US 10,474,488 B2
(45) Date of Patent: Nov. 12, 2019

(54) CONFIGURATION OF A CLUSTER OF HOSTS IN VIRTUALIZED COMPUTING ENVIRONMENTS

(71) Applicant: VMware, Inc., Palo Alto, CA (US)

(72) Inventors: Kiril Aleksandrov, Sofia (BG); Boris Stoicov, Sofia (BG); Zdravko Ivanov, Sofia (BG)

(73) Assignee: VMWARE, INC., Palo Alto, CA (US)

(*) Notice: Subject to any disclaimer, the term of this patent is extended or adjusted under 35 U.S.C. 154(b) by 208 days.

(21) Appl. No.: 15/286,599

(22) Filed: Oct. 6, 2016

(65) Prior Publication Data
US 2018/0101395 A1    Apr. 12, 2018

(51) Int. Cl.
*G06F 9/455*    (2018.01)
*G06F 9/50*    (2006.01)
*G06F 9/52*    (2006.01)

(52) U.S. Cl.
CPC ........ *G06F 9/45558* (2013.01); *G06F 9/5077* (2013.01); *G06F 9/52* (2013.01); *G06F 2009/4557* (2013.01); *G06F 2009/45595* (2013.01)

(58) Field of Classification Search
CPC ...... G06F 9/52; G06F 9/45558; G06F 9/5077; G06F 2009/4557; G06F 2009/45595
See application file for complete search history.

(56) References Cited

U.S. PATENT DOCUMENTS

| | | | |
|---|---|---|---|
| 8,108,878 B1* | 1/2012 | Pulsipher | G06F 9/524 718/100 |
| 9,916,133 B2* | 3/2018 | Jubran | G06F 8/00 |
| 2011/0131448 A1* | 6/2011 | Vasil | G06F 9/5038 714/19 |
| 2013/0232463 A1* | 9/2013 | Nagaraja | G06F 8/61 717/101 |
| 2015/0264122 A1* | 9/2015 | Shau | H04L 67/10 709/203 |
| 2016/0103706 A1* | 4/2016 | Novaes | G06F 9/4881 718/102 |
| 2016/0241438 A1* | 8/2016 | Sundaram | H04L 41/0806 |
| 2016/0378785 A1* | 12/2016 | Liu | G06F 16/27 707/610 |
| 2017/0285982 A1* | 10/2017 | DeArment | G06F 9/44505 |
| 2017/0346683 A1* | 11/2017 | Li | H04L 41/0803 |
| 2018/0143854 A1* | 5/2018 | Kumar | G06F 9/4881 |

* cited by examiner

*Primary Examiner* — Benjamin C Wu
(74) *Attorney, Agent, or Firm* — Su IP Consulting

(57) ABSTRACT

Example methods are provided for configuring a cluster of hosts in a virtualized computing environment. The method may comprise obtaining a configuration specification that specifies multiple features associated with the cluster of hosts and identifying one or more dependencies associated with multiple configuration tasks that are executable for configuring the set of features. The method may also comprise, based on the one or more dependencies, determining a configuration workflow that defines an order in which at least some of the multiple configuration tasks are executed. The method may further comprise orchestrating execution of the at least some of the multiple configuration tasks according to the configuration workflow.

18 Claims, 7 Drawing Sheets

CONFIGURATION OF A CLUSTER OF HOSTS IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. Further, through storage virtualization, storage resources of a cluster of hosts may be aggregated to form a single shared pool of storage. The shared pool is accessible by virtual machines supported by the hosts within the cluster. In practice, however, configuration of the cluster of hosts could be a tedious process that takes up a lot of time and effort.

DETAILED DESCRIPTION

Figure 1:
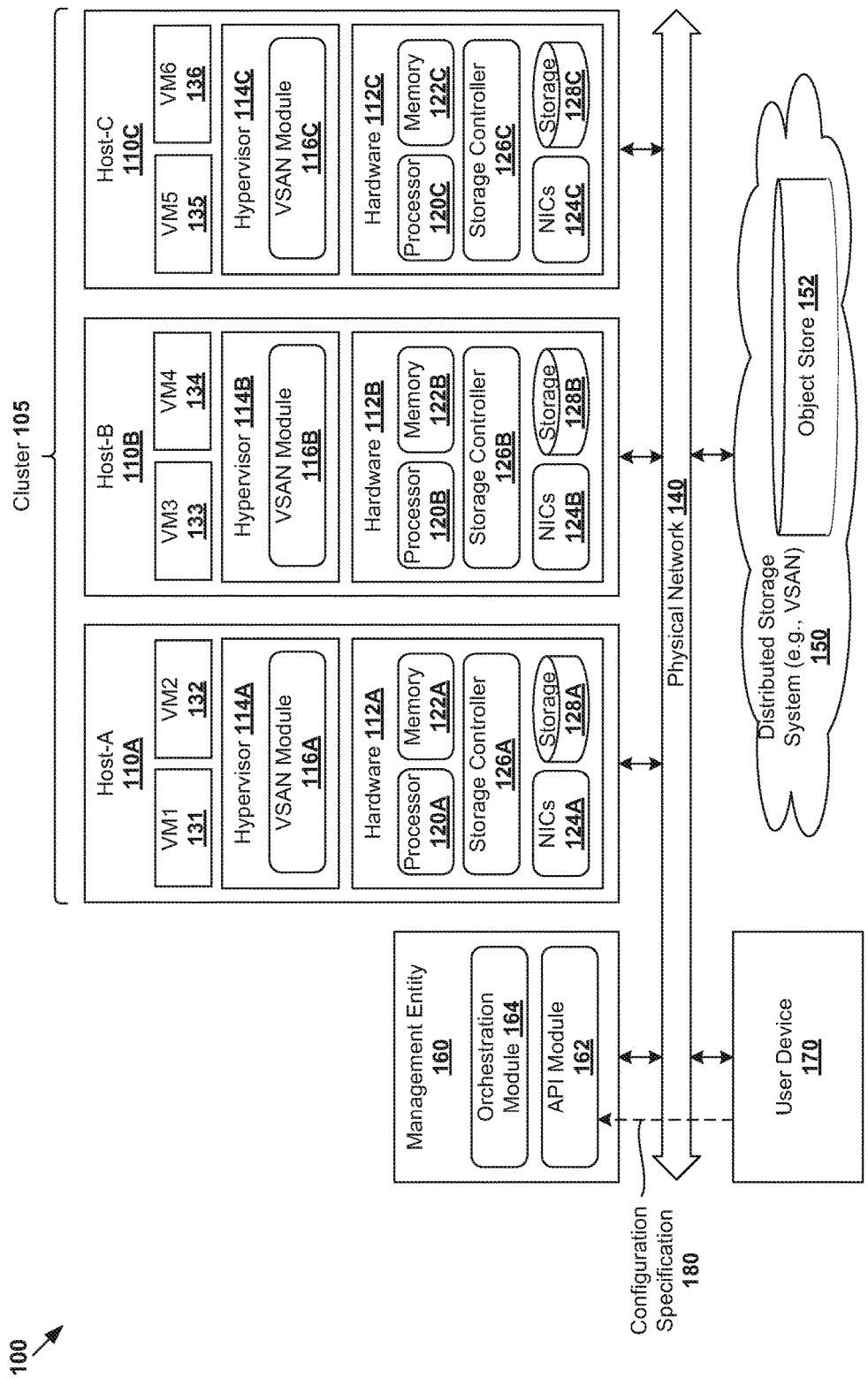
FIG. 1 is a schematic diagram illustrating a first example virtualized computing environment in which configuration of a cluster of hosts may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to configuration in virtualized computing environments will now be explained in more detail using FIG. 1, which is a schematic diagram illustrating first example virtualized computing environment 100 in which configuration of cluster 105 of hosts may be implemented. It should be understood that, depending on the desired implementation, virtualized computing environment 100 may include additional and/or alternative components than that shown in FIG. 1.

In the example in FIG. 1, virtualized computing environment 100 includes cluster 105 of multiple hosts, such as Host-A 110A, Host-B 110B, and Host-C 110C. In the following, reference numerals with a suffix "A" relates to Host-A 110A, suffix "B" relates to Host-B 110B, and suffix "C" relates to Host-C 110C. Although three hosts (also known as "host computers", "physical servers", "server systems", "host computing systems", etc.) are shown for simplicity, cluster 105 may include any number of hosts.

Each host 110A/110B/110C in cluster 105 includes suitable hardware 112A/112B/112C and executes virtualization software such as hypervisor 114A/114B/114C to maintain a mapping between physical resources and virtual resources assigned to various virtual machines. For example, Host-A 110A supports VM1 131 and VM2 132; Host-B 110B supports VM3 133 and VM4 134; and Host-C 110C supports VM5 135 and VM6 136. In practice, each host 110A/110B/110C may support any number of virtual machines, with each virtual machine executing a guest operating system (OS) and applications. Hypervisor 114A/114B/114C may also be a "type 2" or hosted hypervisor that runs on top of a conventional operating system on host 110A/110B/110C.

Although examples of the present disclosure refer to "virtual machines," it should be understood that a "virtual machine" running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Hardware 112A/112B/112C includes any suitable components, such as processor 120A/120B/120C (e.g., central processing unit (CPU)); memory 122A/122B/122C (e.g., random access memory); network interface controllers (NICs) 124A/124B/124C to provide network connection; storage controller 126A/126B/126C that provides access to storage resources 128A/128B/128C, etc. Corresponding to hardware 112A/112B/112C, virtual resources assigned to each virtual machine may include virtual CPU, virtual memory, virtual disk(s), virtual NIC(s), etc.

Storage controller 126A/126B/126C may be any suitable controller, such as redundant array of independent disks (RAID) controller, etc. Storage resource 128A/128B/128C may represent one or more disk groups. In practice, each disk group represents a management construct that combines one or more physical disks, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, Integrated Drive Electronics (IDE) disks, Universal Serial Bus (USB) storage, etc.

Through storage virtualization, hosts 110A-110C in cluster 105 aggregate their storage resources 128A-128C to form distributed storage system 150, which represents a shared pool of storage resources. For example in FIG. 1, Host-A 110A, Host-B 110B and Host-C 110C aggregate respective local storage resources 128A, 128B and 128C into object store 152 (also known as a datastore or a collection of datastores). In this case, data (e.g., virtual machine data) stored on object store 152 may be placed on, and accessed from, one or more of storage resources 128A-128C. In practice, distributed storage system 150 may employ any suitable technology, such as Virtual Storage Area Network (VSAN) from VMware, Inc. Cluster 105 may be referred to as a VSAN cluster.

In virtualized computing environment 100, management entity 160 provides management functionalities to configure various managed objects, such as cluster 105, hosts 110A-110C, virtual machines 131-136, etc. Conventionally, the configuration of cluster 105 in virtualized computing environment 100 may be a tedious process. For example, to configure distributed storage system 150 in FIG. 1, a user (e.g., network administrator operating user device 170) generally has to navigate through a series of dialogs and/or wizards to enable or disable various features. The configuration is usually performed in a serial manner, which means that the user must wait for some features to be configured before being allowed to start on the next. Such configuration process takes up a lot of time and effort, and lacks efficiency.

Configuration Task Orchestration

According to examples of the present disclosure, cluster 105 in virtualized computing environment 100 may be configured by orchestrating execution of configuration tasks according to a configuration workflow. The order in which the configuration tasks are executed may be dynamically determined based on one or more dependencies associated with configuration tasks. This way, the configuration process may be implemented more efficiently.

Figure 2:
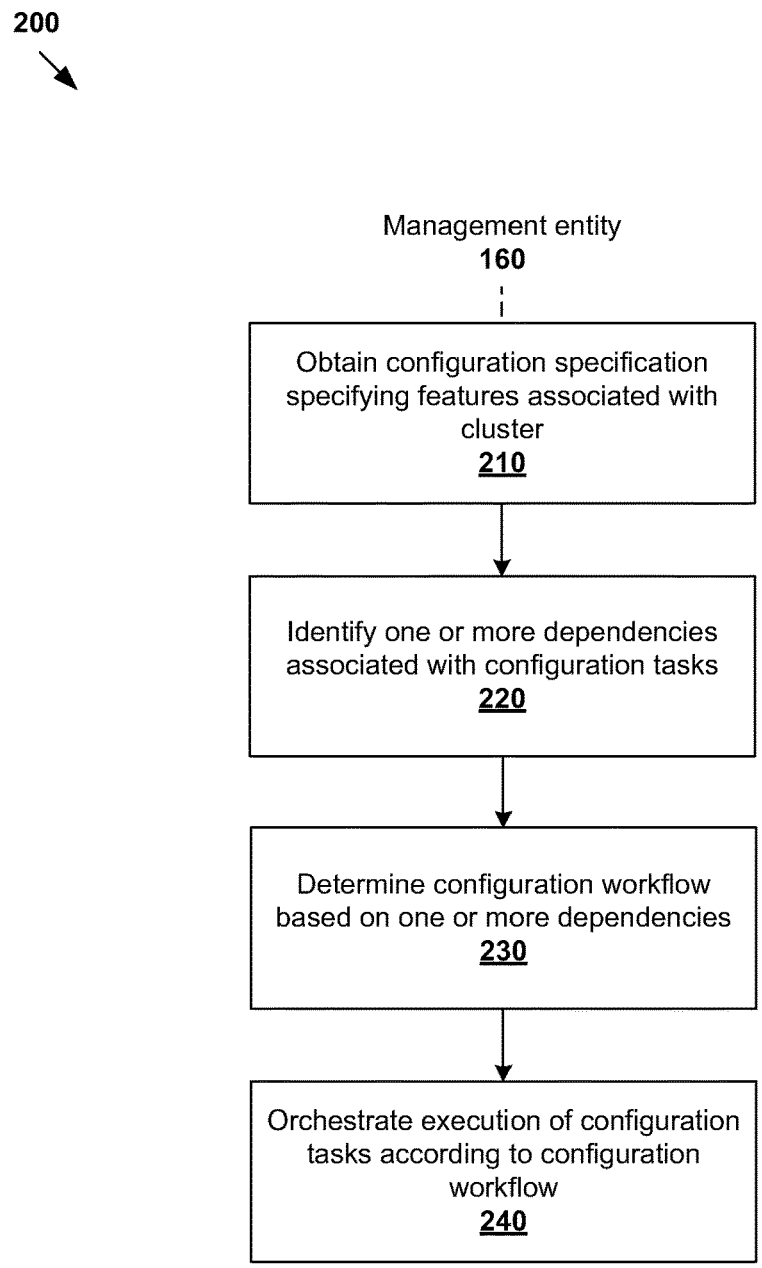
FIG. 2 is a flowchart of an example process for a management entity to configure a cluster of hosts in a virtualized computing environment.

In more detail, FIG. 2 is a flowchart of example process 200 for management entity 160 to configure cluster 105 of hosts in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. Example process 200 may be performed by management entity 160, such as using orchestration module 164, etc. Management entity 160 may be implemented by one or more physical and/or virtual entities.

At 210 in FIG. 2, configuration specification 180 is obtained. Configuration specification 180 may specify any suitable features associated with cluster 105, such as features of distributed storage system 150 in FIG. 1. Once configured, each feature may be implemented by hosts 110A-110C in cluster 105 in a distributed manner, and/or management entity 160 in a centralized manner. As will be explained further using FIG. 3, configuration specification 180 may be obtained through an invocation of a single application programming interface (API) call supported by the management entity 160.

For example in FIG. 1, the API call may be supported by management entity 160 using API module 162. In practice, configuration specification 180 may be in any suitable form, such as data object(s), file(s), etc. Once configuration is completed, an indication may be sent to user device 170 to inform the user. This facilitates "end-to-end" configuration that reduces or minimizes the amount of interaction between management entity 160 and user device 170 during the configuration process.

At 220 in FIG. 2, one or more dependencies associated with multiple configuration tasks executable to configure the features are identified. At 230 in FIG. 2, based on the one or more dependencies, a configuration workflow is determined. The configuration workflow is to define an order in which at least some of the multiple configuration tasks are executed. At 240 in FIG. 2, execution of at least some of the multiple configuration tasks is orchestrated according to the configuration workflow.

Using example process 200, execution configuration tasks may dynamically ordered and orchestrated to improve efficiency. In the above, the term "at least some of the multiple configuration tasks" includes the case of executing all of the multiple configuration tasks, and the case of executing some of them. In the latter case, a particular configuration task may be excluded from the configuration workflow to improve efficiency, such as when that configuration task is redundant.

In one example, an inter-task dependency between two configuration tasks (e.g., "first configuration task" and "second configuration task") may be identified. In this case, depending on the inter-task dependency, execution of the first configuration task may be ordered before or after execution of the second configuration task. Otherwise (i.e., no inter-task dependency), execution of the first configuration task may be ordered in parallel with execution of the second configuration task.

In another example, a state dependency associated with a first configuration task may be identified, in which case execution of the first configuration task depends on a state ("first state") of cluster 105. In a first scenario, execution of the first configuration task may be ordered before execution of a second configuration task that updates the first state to a second state. In a second scenario, execution of the first configuration task may be ordered after execution of a second configuration task that updates the second state to the first state. In a third scenario, in response to identifying the state dependency and determination that the first state is not achievable, it may be determined that the first configuration task cannot be executed successfully. In this case, an error may be returned, such as to indicate to the user that configuration cannot be performed successfully based on configuration specification 180.

In the following, various examples will be explained using FIG. 3 to FIG. 7. In particular, example detailed process will be explained using FIG. 3, example configuration specification 180 using FIG. 4, example configuration workflows using FIG. 5A, FIG. 5B, FIG. 5C and FIG. 5D, additional example configurations using FIG. 6 and example computing system using FIG. 7.

Example Cluster Configuration

Figure 3:
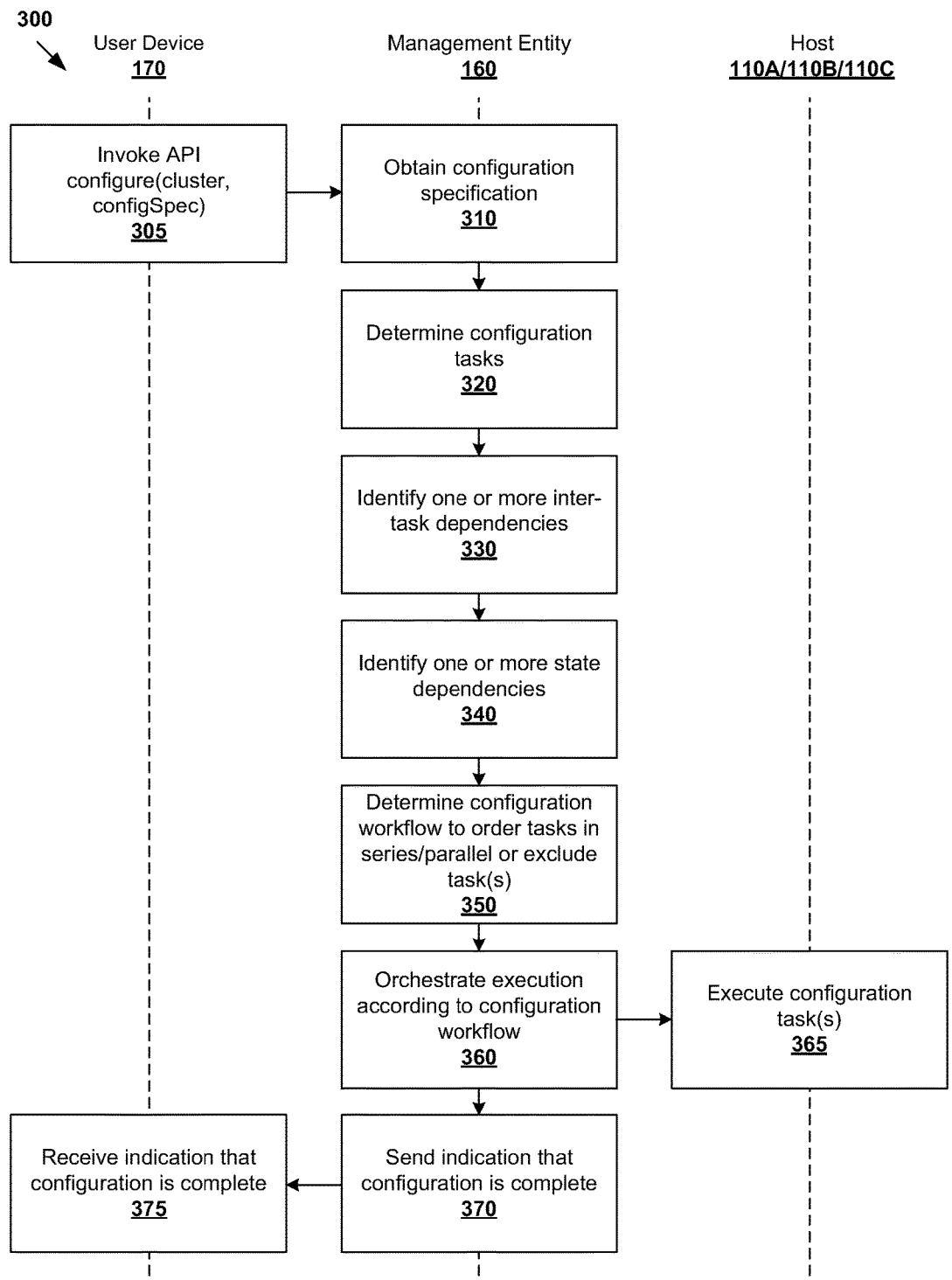
FIG. 3 is a flowchart of an example detailed process for a management entity to configure a cluster of hosts in a virtualized computing environment.

FIG. 3 is a flowchart of example detailed process 300 to configure cluster 105 in virtualized computing environment 100. Example detailed process 300 may include one or more operations, functions, or actions illustrated by one or more blocks, such as 310 to 375. The various blocks may be combined into fewer blocks, divided into additional blocks, and/or eliminated depending on the desired implementation. Example process 300 may be implemented by management entity 160 using any suitable module, such as orchestration module 164, etc.

(a) Configuration Specification

At 305 and 310 in FIG. 3, management entity 160 obtains configuration specification 180 that specifies features associated with cluster 105 through an invocation of an API call by user device 170. For example in FIG. 3, the API call to configure distributed storage system 150 is configure(cluster, configSpec), which is supported by API module 162 of management entity 160. Parameter cluster is to identify cluster 105 and parameter configSpec is a wrapper object representing configuration specification 180.

API call configure(cluster, configSpec) serves as a common "façade" above individual configuration APIs that may be invoked to configure various features of distributed storage system 150. This facilitates end-to-end configuration of cluster 105 using a single API call that speeds up the configuration process and minimizes the amount of interaction required of the user. This way, the complexity of the individual configuration APIs may be abstracted from the user. It is not necessary for the user to be aware of the individual configuration APIs and the parameter(s) required to invoke them.

Figure 4:
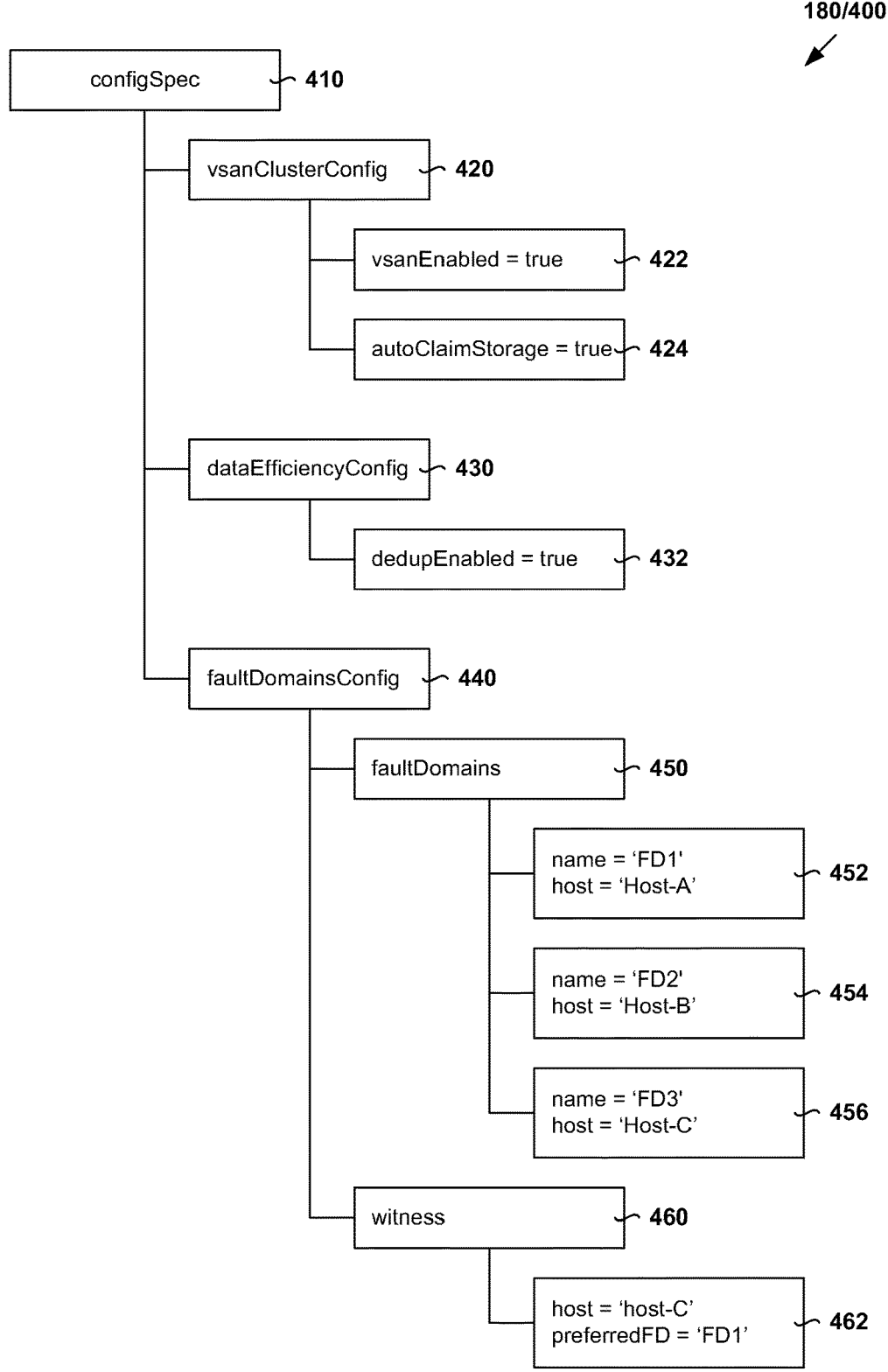
FIG. 4 is a schematic diagram illustrating example configuration specification.

FIG. 4 is a schematic diagram illustrating example configuration specification 180. In the example in FIG. 4, configuration specification 180 is a single wrapper object in the form of configSpec (see 410) that specifies a set of features associated cluster 105, and more particularly distributed storage system 150. The features may be specified under various categories, such as vsanClusterConfig (see 420) for VSAN cluster configuration; dataEfficiencyConfig (see 430) for data storage efficiency configuration and faultDomainsConfig (see 440) for fault domain configuration.

Relating to vsanClusterConfig (see 420), feature vsanEnabled (see 422) specifies whether VSAN is enabled for cluster 105. In the case of vsanEnabled=true, distributed storage system 150 is formed by aggregating storage resources 128A/128B/128C from each host 110A/110B/110C in cluster 105. Feature autoClaimStorage (see 424) specifies whether the automatic disk claiming mode is enabled. In the automatic mode (i.e., autoClaimStorage=true in FIG. 4), cache disks and capacity disks contributing to distributed storage system 150 will be automatically claimed. In the manual mode (i.e., autoClaimStorage=false), the specific cache disks and capacity disks are manually specified by the user in configuration specification 180.

Relating to dataEfficiencyConfig (see 430), feature dedupEnabled (see 432) specifies whether deduplication is enabled. When enabled (i.e., dedupEnabled=true), deduplication improves the total cost of ownership by reducing the data stored on physical disks. In practice, deduplication cannot be enabled unless the disk claiming mode is set to manual (i.e., when autoClaimStorage=false).

Relating to faultDomainsConfig (see 440), feature faultDomains (see 450) specifies one or more fault domains to be configured for improving fault tolerance. In the example in FIG. 4, three fault domains are configured: first fault domain with name='FD1' and host=Host-A 110A (see 452); second fault domain with name='FD2' and host=Host-B 110B (see 454) and third fault domain with name='FD3' and host=Host-C 110C (see 456). Feature "witness" (see 460) is to configure Host-C 110C as a witness host and 'FD1' as the preferred fault domain. This has the effect of setting 'FD2' as the secondary fault domain that takes over in the event of a failover.

In virtualized computing environment 100, each fault domain may be a logical zone within which a failure may affect one or more hosts. In general, a fault domain may represent a datacenter, pod, rack and chassis, etc. For example, a chassis may refer to an enclosure in which one or more hosts are mounted. A rack (e.g., server rack) may include one or more chassis stacked within a pod. A pod may be a modular unit of datacenter with a set of resources or infrastructure to service one or more racks. A datacenter may be a collection of hosts housed in one or more pods, racks and chassis. Each fault domain may be affected by power failure, software failure, hardware failure, network failure, any combination thereof, etc.

Configuration specification 180 may be in any suitable format, such as VMware Managed Object Design Language (VMODL), etc. Although some examples are shown in FIG. 4, configuration specification 180 may specify any additional and/or alternative features of distributed storage system 150, or other functionality implemented by cluster 105 and/or management entity 160.

(b) Configuration Tasks

Referring again to FIG. 3, at 320, multiple configuration tasks may be determined based on configuration specification 180. This has the effect of "mapping" the single API call configure(cluster, configSpec) to the individual configuration APIs required for configuring the features in configuration specification 180. In practice, the specific configuration tasks required may depend on the design and implementation of the individual configuration APIs. Some example configuration tasks labelled "T1" to "T5" are discussed below. In practice, it should be understood that a task may be divided into multiple sub-tasks, or multiple tasks may be combined into a single task.

Task T1 may be executed to configure feature "vsanEnabled" (see 422 in FIG. 4) to enable VSAN for cluster 105. For example, task T1 may be executed by invoking configuration API enableVSAN(cluster, vsanEnabled), where parameter cluster identifies cluster 105 and parameter vsanEnabled is extracted from configuration specification 180 in FIG. 4.

Task T2 may be executed to configure feature "autoClaimStorage" (see 424 in FIG. 4) to set the disk claiming mode. For example, task T2 may be executed by invoking configuration API setAutoDiskClaim(cluster, autoClaimStorage), where parameter cluster identifies cluster 105 and parameter autoClaimStorage is extracted from configuration specification 180 in FIG. 4.

Task T3 may be executed to configure feature "dedupEnabled" (see 432 in FIG. 4) to enable deduplication. For example, task T3 may be executed by invoking configuration API enableDedup(cluster, dedupEnabled), where parameter cluster identifies cluster 105 and parameter dedupEnabled is extracted from configuration specification 180 in FIG. 4.

Task T4 may be executed to configure feature "faultDomains" (see 450 to 456 in FIG. 4). For example, task T4 may be executed by invoking configuration API configureFD (cluster, faultDomains.name,faultDomains.host), where parameters faultDomains.name and faultDomains.host identify the respective name and host(s) of each fault domain. In practice, task T4 may be further divided into multiple sub-tasks that can be performed in parallel. For example, the three fault domains may be configured in parallel to further optimize configuration workflow processing.

Task T5 may be executed to configure feature "witness" (see 460 and 462 in FIG. 4) to create a witness host. For example, task T5 may be executed by invoking configuration API configureWitness(cluster, witness.host, witness.preferredFD), where parameters witness.host and witness.preferredFD identify the witness host and preferred fault domain of cluster 105, respectively.

(c) Configuration Workflow

Figure 5A:
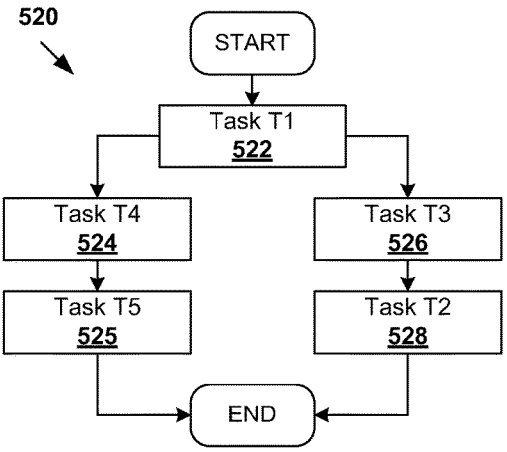
FIG. 5A is a schematic diagram illustrating a first example configuration workflow based on first set of configuration tasks.
Figure 5B:
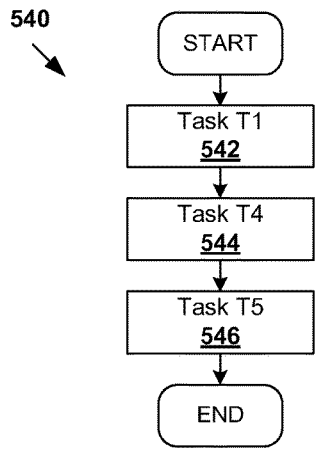
FIG. 5B is a schematic diagram illustrating a second example configuration workflow based on second set of configuration tasks.
Figure 5C:
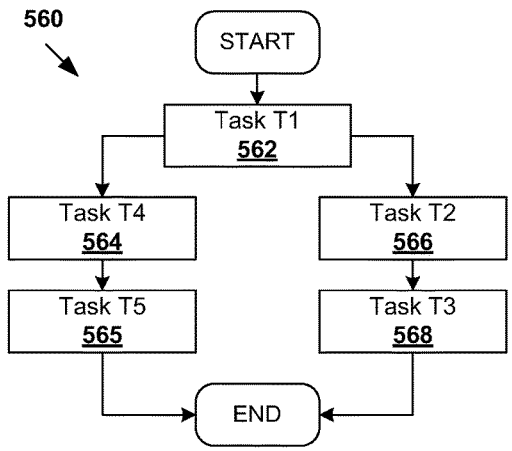
FIG. 5C is a schematic diagram illustrating a third example configuration workflow based on third set of configuration tasks.
Figure 5D:
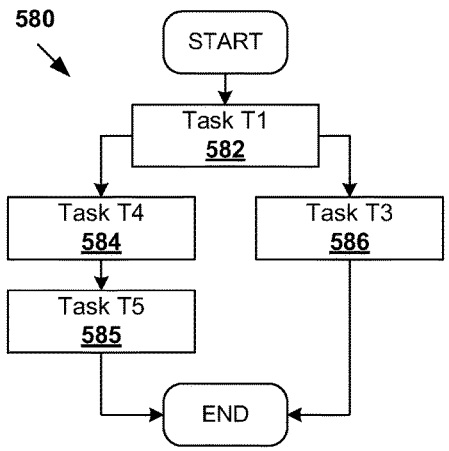
FIG. 5D is a schematic diagram illustrating a fourth example configuration workflow based on fourth set of configuration tasks.

In the following, some examples will be explained using blocks 330 to 350 in FIG. 3, FIG. 5A, FIG. 5B, FIG. 5C and FIG. 5D. FIG. 5A is a schematic diagram illustrating first example configuration workflow 520 based on first set of configuration tasks 510; FIG. 5B is a schematic diagram illustrating second example configuration workflow 540 based on second set of configuration tasks 530; FIG. 5C is a schematic diagram illustrating third example configuration workflow 560 based on third set of configuration tasks 550 and FIG. 5D is a schematic diagram illustrating fourth example configuration workflow 580 based on fourth set of configuration tasks 570.

To orchestrate execution of the configuration tasks in an optimized manner, various factors have to be considered. For example, this may involve management entity 160 analyzing the configuration tasks to identity one or more dependencies associated with the configuration tasks. In particular, at 330 in FIG. 3, an "inter-task dependency" between at least two configuration tasks may be identified. For example in FIG. 4, it is necessary to enable VSAN by executing task T1 before proceeding to remaining tasks T2, T3, T4 and T5. On the other hand, tasks T4 and T5 may be executed in parallel with task T2 and task T3 in the absence of any inter-dependence.

At 340 in FIG. 3, a "state dependency" may be identified. This means that a particular configuration task is associated with a state of cluster 105 in which it can be executed successfully. The state dependency may be identified by comparing (a) a current state of cluster 105 with (b) a desired state of cluster 105. For example, successful execution of task T3 (i.e., to enable deduplication) depends on cluster 105 being in a state with disk claiming mode set to manual. Depending on the current state and desired state, task T3 may be ordered before task T2 (see FIG. 5A), or after task T2 (see FIG. 5C). If it is determined that the required state is not achievable (see FIG. 5B), an error may be returned.

At 350 in FIG. 5, based on the dependencies identified above, a configuration workflow is determined to define an order in which at least some of tasks T1 to T5 are executed. Note that the dependency identification at 330 and 340 may be performed iteratively and repeatedly until the configuration workflow is optimized. In the following, four scenarios will be discussed with reference to FIG. 5A, FIG. 5B, FIG. 5C and FIG. 5D. Note that task T2 is to set disk claiming=automatic in FIG. 5A and FIG. 5B, which should be contrasted against the case of setting disk claiming=manual in FIG. 5C and FIG. 5D.

In a first example in FIG. 5A, disk claiming mode=manual in the current state (see 512), and disk claiming mode=automatic in the desired state after task T2 is executed. In this case, configuration workflow 520 starts with task T1 (see 522), which is ordered before tasks T2, T3, T4 and T5. Due to the inter-task dependency between tasks T4 and T5, execution of T5 (see 525) is ordered after execution of task T4 (see 524). Due to the state dependency of task T3, execution of task T3 (see 526) is ordered before execution of task T2 (see 528) that updates the disk claiming mode from manual to automatic. Due to the absence of any inter-task dependency between tasks T4 and T5 on the one hand and tasks T3 and T2 on the other hand, execution of task T4 and task T5 is ordered in parallel with the execution of task T2 and task T3. Configuration workflow 520 ends after task T2 and task T5 are both completed.

In a second example in FIG. 5B, disk claiming mode=automatic in the current state (see 532), which is the same as the desired state of disk claiming mode=automatic after task T2 is executed. Similar to the example in FIG. 5A, configuration workflow 540 starts with task T1 (see 542). Since disk claiming mode is already automatic in the current state, task T2 is redundant and excluded (see 534). Task T4 (see 544) and task T5 (see 546) are ordered after task T1. However, since disk claiming mode=automatic, task T3 cannot be executed (see 536) because the required state of disk claiming mode=manual is not achievable. In this case, an error is returned, such as to user device 170 via API module 162.

In a third example in FIG. 5C, the current state of disk claiming mode=automatic (see 552), and disk claiming mode=manual in the desired state after task T2 is executed. Similar to the above examples, configuration workflow 560 starts with task T1 (see 562), which is ordered before tasks T2, T3, T4 and T5. Due to the state dependency of task T3, execution of task T3 (see 568) is ordered after execution of task T2 (see 566) that updates the disk claiming mode from automatic to manual. Similar to the example in FIG. 5A, execution of task T4 (see 564) and task T5 (see 565) is ordered in parallel with the execution of task T2 and task T3. Configuration workflow 560 ends after task T3 and task T5 are both completed.

In a fourth example in FIG. 5D, the current state of disk claiming mode=manual (see 572), which is the same as the desired state of disk claiming mode=manual after task T2 is executed. Configuration workflow 580 starts with task T1 (see 582). Since disk claiming mode=manual in the current state, task T3 (see 586) may be performed successfully. Since the current state is the same as the desired state, task T2 is redundant and excluded from the workflow (see 574). Task T4 (see 584) and task T5 (see 585) are ordered after task T1, but in parallel with task T3. Configuration workflow 580 ends after task T5 and task T3 are completed.

As demonstrated by the above examples, tasks T1-T5 may be dynamically ordered based on their inter-task dependencies, as well as a comparison of the current state and the desired state associated with cluster 105. This means that it is not necessary to execute the same set of configuration tasks in the same order each and every time. Instead, the configuration workflow is adaptive to improve efficiency, and configuration tasks may be excluded if they are redundant. Also, the configuration process may dynamically take into account whether a particular task cannot be executed successfully at a particular point in time (e.g., due to state dependency). The complexity of the configuration workflow is hidden from the user.

At 360 in FIG. 3, execution of the configuration tasks are orchestrated according to the configuration workflow. In practice, this may involve invoking individual configuration APIs associated with respective configuration tasks in the workflow. For example, as discussed above, task T1 may be executed by invoking configuration API enableVSAN( ); task T2 by invoking setAutoDiskClaim( ); task T3 by invoking enableDedup( ); task T4 by invoking configureFD ( ) and task T5 by invoking configureWitness( ) with the relevant parameters according to the order defined by the relevant configuration workflow.

Where applicable, at 365 in FIG. 3, execution of a configuration API may involve instructing host 110A/110B/

110C in cluster 105 to configure a specific feature. For example, in the context of VSAN cluster configuration, management entity 160 may send any suitable instructions to VSAN module 116A/116B/116C of associated host 110A/110B/110C, such as using VMODL, etc.

At 370 and 375 in FIG. 3, once configuration is completed, an indication is sent to user device 170 to inform the user accordingly.

Resource Management and Network Virtualization Configuration

Although explained with reference to distributed storage system 150, it should be understood that examples of the present disclosure may be implemented to configure any suitable features associated with a cluster of hosts. Some additional examples are discussed below with reference to FIG. 6, which is a schematic diagram illustrating second example virtualized computing environment 600 in which configuration of cluster 605 of hosts may be implemented.

(a) Resource Management

Figure 6:
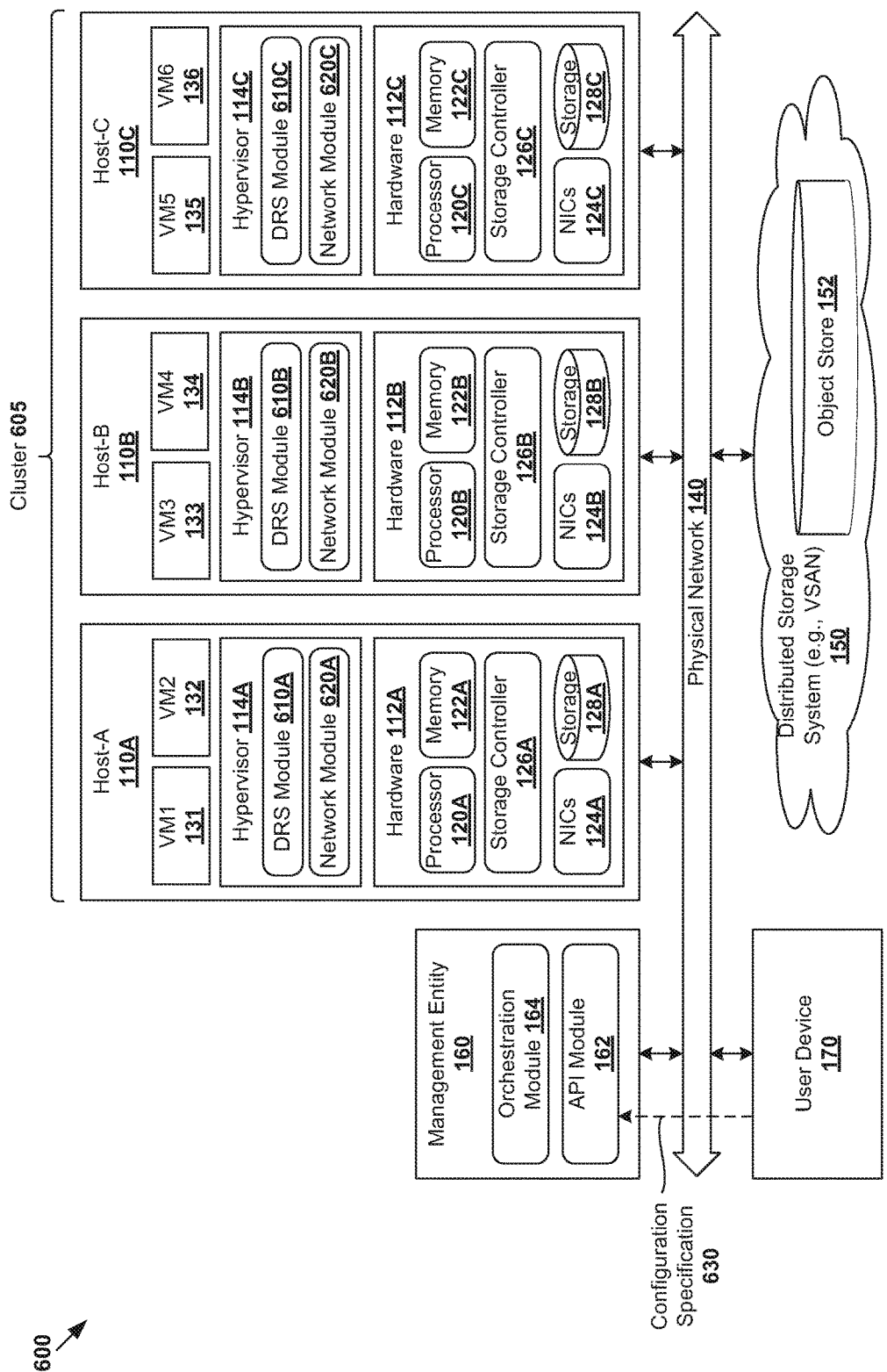
FIG. 6 is a schematic diagram illustrating a second example virtualized computing environment in which configuration of a cluster of hosts may be implemented.

In the example in FIG. 6, cluster 605 may be configured as a distributed resource scheduler (DRS) cluster to implement a resource management system that supports cluster-wide resource pools and enforces cluster-level resource allocation policies relating to load balancing, power management, high availability, virtual machine placement, etc. The resource management system may be implemented by management entity 160, Host-A 110A using DRS module 610A, Host-B 110B using DRS module 610B and Host-C 110C using DRS module 610C, any combination thereof, etc.

Features of the resource management system may be specified in a configuration specification (see 630) and configured according to examples of the present disclosure. Examples include automation level (e.g., manual, partially automated, fully automated), migration threshold (e.g., from conservative to aggressive), enabled forecasted metrics, virtual machine automation, DRS policies (e.g., even distribution of virtual machines, consumed memory vs active memory), CPU over-commitment, power management automation level, etc.

In relation to load balancing, configuration specification 630 may specify policies relating to distribution of resources for all hosts 110A-110C and virtual machines 131-136, and policies relating to virtual machine migrations to improve resource utilization. In relation to power management, configuration specification 630 may specify policies relating to how a host's power state is dynamically updated based on its power consumption. For example, Host-A 110A may be placed in standby power mode if low power consumption is detected.

In relation to virtual machine placement, configuration specification 630 may specify affinity rules or anti-affinity rules that control the placement of virtual machines 131-136 among hosts 110A-110C in cluster 605. In relation to high availability operations, configuration specification 630 may specify primary and secondary hosts in cluster 105, policies relating to failure detection (e.g., heartbeat exchange frequency), policies relating to host network isolation, etc. Similar to the examples in FIG. 1 to FIG. 5D, a configuration workflow may be determined to orchestrate execution of configuration tasks based on configuration specification 630. Once configured, features of the resource management system may be implemented using DRS module 610A/610B/610C and/or management entity 160.

(b) Network Virtualization

Additionally or alternatively, cluster 605 may be configured as a network virtualization cluster, in which case Host-A 110A, Host-B 110B and Host-C 110C aggregate their network resources (e.g., NIC(s) 124A/124B/124C, etc.) to support network virtualization functionality. In the example in FIG. 6, the network virtualization system may be implemented by management entity 160, Host-A 110A using network module 620A, Host-B 110B network module 620B and Host-C 110C using network module 620C, any combination thereof. Management entity 160 may be a network virtualization manager, sometimes referred to as a software defined network (SDN) manager. (An example of a network manager is the NSX manager component of VMware NSX™, available from VMware, Inc.).

Through network virtualization, benefits similar to server virtualization may be derived for networking services in virtualized computing environment 600. For example, software-defined networks (SDNs) may be provisioned, changed, stored, deleted and restored programmatically via network management entity 160 without having to reconfigure the underlying physical hardware. Further, network segmentation may be implemented to segment a data center into distinct network segments using software, such as by deploying virtual network(s) on top of the physical network. This form of software-based network segmentation should be contrasted against traditional hardware-based physical segmentation that is enabled using physical devices, such as Top of Rack (ToR) switches, aggregate switches, core switches, routers, etc.

Features of the network virtualization system may be specified in a configuration specification (see 630) and configured according to examples of the present disclosure. Examples include features relating to logical switches, logical routers, logical firewall (e.g., distributed firewall), logical load balancer, distributed switches, virtual local area network (VLAN) parameters, virtual extensible local area network (VXLAN) parameters, associated policies, etc. Similar to the examples in FIG. 1 to FIG. 5D, a configuration workflow may be determined to orchestrate execution of configuration tasks based on configuration specification 630. Once configured, features of the network virtualization system may be implemented using network module 620A/620B/620C and/or management entity 160.

Computing System

Figure 7:
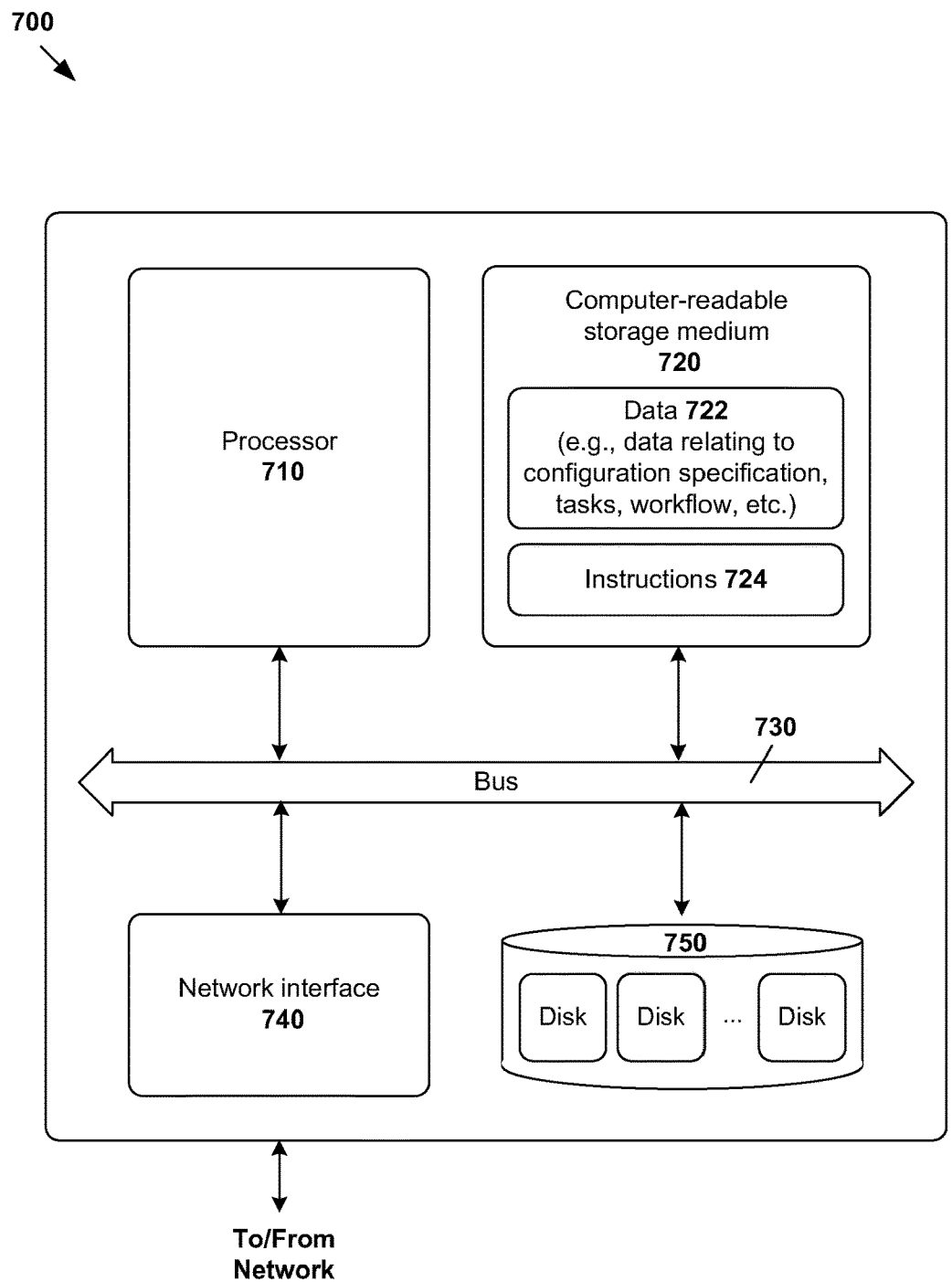
FIG. 7 is a schematic diagram illustrating an example computing system to configure a cluster of hosts in a virtualized computing environment.

The above examples can be implemented by hardware (including hardware logic circuitry), software or firmware or a combination thereof. FIG. 7 is a schematic diagram illustrating example computing system 700 to configure cluster 105 of hosts in virtualized computing environment 100/600/700. In this example, example computing system 700 is capable of acting as management entity 160, and includes processor 710, computer-readable storage medium 720, network interface 740, and bus 730 that facilitates communication among these illustrated components and other components.

Processor 710 is to perform processes described herein with reference to the drawings. Computer-readable storage medium 720 may store any suitable data 722, such as data relating to configuration specifications, configuration tasks, configuration workflows, etc. Computer-readable storage medium 720 may further store computer-readable instructions 724 ("program code") that, in response to execution by processor 710, cause processor 710 to perform processes described using FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

It will be understood that although the terms "first," "second," third" and so forth are used herein to describe various elements, these elements should not be limited by these terms. These terms are only used to distinguish one element from another. For example, within the scope of the present disclosure, a first element may be referred to as a second element, and similarly a second element may be referred to as a first element. As used herein, the term "and/or" includes any and all combinations of one or more of the associated listed items.

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a management entity to configure a cluster of hosts in a virtualized computing environment, wherein the method comprises:
   obtaining a configuration specification that specifies multiple features associated with the cluster of hosts;
   identifying whether there is an inter-task dependency between a first configuration task and a second configuration task from multiple configuration tasks, wherein the first configuration task is to configure a first feature from the multiple features, and the second configuration task is to configure a second feature from the multiple features;
   identifying whether there is a state dependency associated with a first state associated with the cluster of hosts and the first configuration task, wherein an order in which the first configuration task and the second configuration task are executed depends on the first state, and the first state is updated by execution of the second configuration task;
   based on the identifying whether there is the inter-task dependency and the identifying whether there is the state dependency, determining a configuration workflow that defines the order in which the first configuration task and the second configuration task are executed; and
   orchestrating execution of the first configuration task and the second configuration task according to the configuration workflow.

2. The method of claim 1, wherein obtaining the configuration specification comprises:
   obtaining the configuration specification through invocation of a single application programming interface (API) call supported by the management entity, wherein the API call identifies the cluster of hosts and provides the configuration specification.

3. The method of claim 1, wherein obtaining the configuration specification comprises one or more of the following:
   obtaining the configuration specification that specifies multiple features of a distributed storage system associated with the cluster of hosts;
   obtaining the configuration specification that specifies multiple features of a resource management system associated with the cluster of hosts; and
   obtaining the configuration specification that specifies multiple features of a network virtualization system associated with the cluster of hosts.

4. The method of claim 1, wherein determining the configuration workflow comprises:
   in response to identifying the inter-task dependency, ordering execution of the first configuration task before execution of the second configuration task in the configuration workflow;
   otherwise, ordering execution of the first configuration task in parallel to execution of the second configuration task in the configuration workflow.

5. The method of claim 1, wherein determining the configuration workflow comprises:
   in response to identifying the state dependency and determination that the first state is achievable, performing one of the following:
      ordering, in the configuration workflow, execution of the first configuration task before execution of the second configuration task that updates the first state to a second state; and
      ordering, in the configuration workflow, execution of the first configuration task after execution of the second configuration task that updates a second state to the first state.

6. The method of claim 1, wherein determining the configuration workflow comprises:
   in response to identifying the state dependency and determination that the first state is not achievable, determining that the first configuration task cannot be executed successfully and returning an error.

7. A non-transitory computer-readable storage medium that includes a set of instructions which, in response to execution by a processor of a management entity, cause the processor to perform a method of configuring a cluster of hosts in a virtualized computing environment, wherein the method comprises:
   obtaining a configuration specification that specifies multiple features associated with the cluster of hosts;
   identifying whether there is an inter-task dependency between a first configuration task and a second configuration task from multiple configuration tasks, wherein the first configuration task is to configure a first feature from the multiple features, and the second configuration task is to configure a second feature from the multiple features;
   identifying whether there is a state dependency associated with a first state associated with the cluster of hosts and the first configuration task, wherein an order in which the first configuration task and the second configuration task are executed depends on the first state, and the first state is updated by execution of the second configuration task;
   based on the identifying whether there is the inter-task dependency and the identifying whether there is the state dependency, determining a configuration workflow that defines the order in which the first configuration task and the second configuration task are executed; and
   orchestrating execution of the first configuration task and the second configuration task according to the configuration workflow.

8. The non-transitory computer-readable storage medium of claim 7, wherein obtaining the configuration specification comprises:
   obtaining the configuration specification through invocation of a single application programming interface (API) call supported by the management entity, wherein the API call identifies the cluster of hosts and provides the configuration specification.

9. The non-transitory computer-readable storage medium of claim 7, wherein obtaining the configuration specification comprises one or more of the following:
   obtaining the configuration specification that specifies multiple features of a distributed storage system associated with the cluster of hosts;
   obtaining the configuration specification that specifies multiple features of a resource management system associated with the cluster of hosts; and
   obtaining the configuration specification that specifies multiple features of a network virtualization system associated with the cluster of hosts.

10. The non-transitory computer-readable storage medium of claim 7, wherein determining the configuration workflow comprises:
   in response to identifying the inter-task dependency, ordering execution of the first configuration task before execution of the second configuration task in the configuration workflow;
   otherwise, ordering execution of the first configuration task in parallel to execution of the second configuration task in the configuration workflow.

11. The non-transitory computer-readable storage medium of claim 7, wherein determining the configuration workflow comprises:
   in response to identifying the state dependency and determination that the first state is achievable, performing one of the following:
      ordering, in the configuration workflow, execution of the first configuration task before execution of the second configuration task that updates the first state to a second state; and
      ordering, in the configuration workflow, execution of the first configuration task after execution of the second configuration task that updates a second state to the first state.

12. The non-transitory computer-readable storage medium of claim 7, wherein determining the configuration workflow comprises:
   in response to identifying the state dependency and determination that the first state is not achievable, determining that the first configuration task cannot be executed successfully and returning an error.

13. A computing system, comprising:
   a processor; and
   a non-transitory computer-readable medium having stored thereon program code that, upon being executed by the processor, causes the processor to:
      obtain a configuration specification that specifies multiple features associated with a cluster of hosts in a virtualized computing environment;
      identify whether there is an inter-task dependency between a first configuration task and a second configuration task from multiple configuration tasks, wherein the first configuration task is to configure a first feature from the multiple features and the second configuration task is to configure a second feature from the multiple features;
      identify whether there is a state dependency associated with a first state associated with the cluster of hosts and the first configuration task, wherein an order in which the first configuration task and the second configuration task are executed depends on the first state, and the first state is updated by execution of the second configuration task;
      based on identification of whether there is the inter-task dependency and identification of whether there is the state dependency, determine a configuration workflow that defines the order in which the first configuration task and the second configuration task are executed; and
      orchestrate execution of the first configuration task and the second configuration task according to the configuration workflow.

14. The computing system of claim 13, wherein program code for obtaining the configuration specification causes the processor to:
   obtain the configuration specification through invocation of a single application programming interface (API) call supported by the management entity, wherein the API call identifies the cluster of hosts and provides the configuration specification.

15. The computing system of claim 13, wherein program code for obtaining the configuration specification causes the processor to perform one or more of the following:
   obtain the configuration specification that specifies multiple features of a distributed storage system associated with the cluster of hosts;
   obtain the configuration specification that specifies multiple features of a resource management system associated with the cluster of hosts; and obtain the configuration specification that specifies multiple features of a network virtualization system associated with the cluster of hosts.

16. The computing system of claim 13, wherein program code for determining the configuration workflow causes the processor to:

in response to identifying the inter-task dependency, order execution of the first configuration task before execution of the second configuration task in the configuration workflow;

otherwise, order execution of the first configuration task in parallel to execution of the second configuration task in the configuration workflow.

17. The computing system of claim 13, wherein program code for determining the configuration workflow causes the processor to:

in response to identifying the state dependency and determination that the first state is achievable, performing one of the following:

order, in the configuration workflow, execution of the first configuration task before execution of the second configuration task that updates the first state to a second state; and order, in the configuration workflow, execution of the first configuration task after execution of the second configuration task that updates a second state to the first state.

18. The computing system of claim 13, wherein program code for determining the configuration workflow causes the processor to:

in response to identifying the state dependency and determination that the first state is not achievable, determine that the first configuration task cannot be executed successfully and return an error.

* * * * *